UNITED STATES PATENT OFFICE 2,864,836
Patented Dec. 16, 1958

2,864,836

6 METHYL 16 OXYΔ⁴PREGNENES AND Δ¹,⁴PREGNADIENES

Frank H. Lincoln, Kalamazoo, William P. Schneider, Kalamazoo Township, Kalamazoo County, and Oldrich K. Sebek and George B. Spero, Kalamazoo, Mich., assignors to The Upjohn Company, Kalamazoo, Mich., a corporation of Michigan No Drawing. Application February 19, 1958
Serial No. 716,019

19 Claims. (Cl. 260—397.45)

The present invention relates to steroid compounds and is more particularly concerned with 6α-methyl-21-fluoro-11β,16α,17α - trihydroxy-4-pregnene-3,20-dione, 6α-methyl-9α,21-difluoro-11β,16α,17α - trihydroxy - 4 - pregnene-3,20-dione, 6α-methyl-21-fluoro-11β,16α,17α-trihydroxy-1,4-pregnadiene-3,20-dione, 6α - methyl - 9α,21 - difluoro-11β,16α,17α - trihydroxy-1,4-pregnadiene-3,20-dione, the 16-esters thereof, the 11-keto analogues and the 16-esters thereof, and a method for the production thereof.

The novel compounds of this invention are illustratively represented by the following formula:

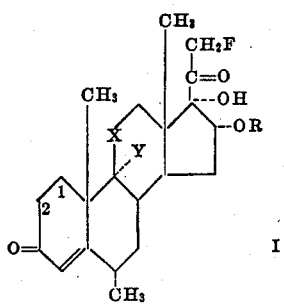

I wherein the 1,2-carbon atom linkage is selected from the linkages consisting of single bond and double bond linkages, Y is selected from the group consisting of hydrogen and fluorine, X is selected from the group consisting of the carbonyl radical (>C=O) and the β-hydroxymethylene radical

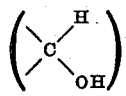

and R is selected from the group consisting of hydrogen and the acyl radical of an organic carboxylic acid, preferably a hydrocarbon carboxylic acid containing from one to twelve carbon atoms, inclusive.

The new compounds, 6α-methyl-21-fluoro-11β,16α,17α-trihydroxy - 4 - pregnene-3,20-dione, 6α-methyl-9α,21-difluoro-11β,16α,17α-trihydroxy - 4 - pregnene-3,20-dione, 6α-methyl - 21 - fluoro-11β,16α,17α-trihydroxy-1,4-pregnadiene - 3,20 - dione, 6α-methyl-9α,21-difluoro-11β,16α,17α - trihydroxy - 1,4 - pregnadiene-3,20-dione, their 16-esters and the 11-keto analogues and the esters thereof, are highly active adrenocortical hormones having greater glucocorticoid and anti-inflammatory activity than hydrocortisone or cortisone. In addition these compounds have diuretic activity and have salt-losing properties which make them especially well suited in the management of chronic congestive heart failure and in the treatment of cirrhosis of the liver, the nephrotic and adrenogenital syndromes and the treatment of eclampsia and preclampsia.

The novel 6α-methyl-21-fluoro-11β,16α,17α-trihydroxy-4-pregnene-3,20-dione, 6α-methyl-9α,21-difluoro-11β,16α, 17α-trihydroxy - 4 - pregnene-3,20-dione, 6α-methyl-21-fluoro - 11β,16α,17α - trihydroxy - 1,4 - pregnadiene-3,20-dione, 6α-methyl-9α,21-difluoro-11β,16α,17α-trihydroxy-1,4-pregnadiene-3,20-dione, the 16-esters thereof, the 11-keto analogues and the 16-esters thereof can be given in oral, parenteral or topical compositions. The compounds can be administered to the animal organism in conventional dosage forms such as pills, tablets and capsules for oral use or in conventional liquid forms as are used with natural and synthetic cortical steroid hormones for injection use. For topical use they can be administered in the form of ointments, creams, lotions and the like with or without co-acting antibiotics, germicides and the like.

The process of the present invention comprises microbiological hydroxylation of 6α-methyl-21-fluoro-11β,17α-dihydroxy - 4 - pregnene-3,20-dione, 6α-methyl-9α,21-difluoro-11β,17α-dihydroxy-4-pregnene-3,20-dione and the Δ¹-analogues thereof to produce the corresponding 16-hydroxy compounds. Esterification of the thus produced 16-hydroxylated compounds is productive of the 16-esters. The corresponding 11-keto analogues of these 16-hydroxylated compounds are obtained by oxidation of the 11-hydroxyl group of the above 16-esterified compounds with an oxidation agent such as chromic acid. If the free alcohols of the 11-keto compounds are desired, the additional step of hydrolyzing the 16-esters such as with an alkali metal base is necessary.

Starting materials for the present invention are 6α-methyl-21-fluoro-11β,17α-dihydroxy - 4 - pregnene-3,20-dione, 6α-methyl - 9α,21 - difluoro-11β,17α-dihydroxy-4-pregnene-3,20-dione, 6α - methyl-21-fluoro-11β,17α-dihydroxy-1,4-pregnadiene-3,20-dione, and 6α-methyl-9α,21-difluoro - 11β,17α-dihydroxy-1,4-pregnadiene-3,20-dione, prepared as described by Spero et al., J. Am. Chem. Soc., 79, 1515 (1957).

In the bioconversion step of the present invention, the operational conditions and reaction procedure and details may be those already known in the art of steroid bioconversion as illustrated by the Murray et al., U. S. Patent 2,602,769, issued July 8, 1952, utilizing, however, the action of an organism of the genus Streptomyces. Among the species which are useful in the fermentation of steroids are *Streptomyces roseochromogenus* (Waksman Collection 3689), *Streptomyces sp.* (A. T. C. C. 11009), and *Streptomyces roseochromogenus* (A. T. C. C. 3347).

The selected species of actinomycete is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively sodium or ammonium phosphate and magnesium sulfate. The medium may desirably have a pH before inoculation of between about 6.5 to about 7.8 though a higher or lower pH may be used. A pH of between about 6.8 and about 7.4 is preferred for the growth of actinomycetes and a temperature range from about 20 to about 35 degrees centigrade with about 20 to 32 degrees centigrade preferred.

The growth period required before the steroid to be fermented is exposed to the actinomycete does not appear to be critical, for example, the steroid may be added either before sterilization of the medium, at the time of inoculating the medium or at sometime later, for example, 24 or 48 hours later. The addition of steroid substrate to be fermented may be accomplished in any suitable manner, such as by dispersing the steroid substrate, either alone with a dispersing agent, or in solution in an organic solvent. Either submerged or surface culture procedures may be used with facility, although submerged culture is preferred.

The temperature during the period of fermentation of the steroid may be the same as that found suitable for the growth of the organism. It need be maintained only within such range as supports life, active growth, or the enzyme activity of the streptomycete.

The time required for the fermentation of steroid varies somewhat with the procedure. When the steroid is added to the actinomycete after substantial growth of the organism, for example, after sixteen to 24 hours at optimum temperature, the conversion of steroid substrate begins immediately and is substantially complete in from two to ten days, five days being generally satisfactory.

After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like. The fermentation liquor and mycelium can be separated and then separately extracted with suitable solvents. The extracts can be combined, either before or after washing with an alkaline solution, illustratively sodium bicarbonate, suitably dried, as for example, over anhydrous sodium sulfate, and the resulting purified transformed steroid obtained by recrystallization from organic solvents, by trituration or by chromatography in order to isolate the thus obtained steroids from the other transformation products.

Bioconversion of 6α - methyl - 21 - fluoro - 11β,17α-dihydroxy - 4 - pregnene - 3,20 - dione, 6α - methyl-9α,21 - difluoro - 11β,17α - dihydroxy - 4 - pregnene-3,20 - dione, 6α - methyl - 21 - fluoro - 11β,17α - dihydroxy - 1,4 - pregnadiene - 3,20 - dione, and 6α - methyl-9α,21 - difluoro - 11β,17α - dihydroxy - 1,4 - pregnadiene-3,20-dione according to the fermentation procedure above described, is productive of 6α - methyl - 21 - fluoro-11β,16α,17α - trihydroxy - 4 - pregnene - 3,20 - dione, 6α - methyl - 9α,21 - difluoro - 11β,16α,17α - trihydroxy-4 - pregnene - 3,20 - dione, 6α - methyl - 21 - fluoro-11β,16α,17α - trihydroxy - 1,4 - pregnadiene - 3,20 - dione, and 6α - methyl - 9α,21 - difluoro - 11β,16α,17α - trihydroxy - 1,4 - pregnadiene - 3,20 - dione, respectively.

The 16-hydroxylated compounds thus produced can be esterified to produce the corresponding 16-esters. This reaction can be performed under esterification conditions known in the art, e. g., by the reaction of the hydroxy compound with the selected acid halide, e. g., acid chloride or acid bromide, the anhydride of a hydrocarbon carboxylic acid, or by reaction with the selected acid, in the presence of an esterification catalyst or with an ester under ester exchange reaction conditions. Reaction conditions which are apt to affect the labile 11β-hydroxy group, or the 6-methyl group should be avoided. Compounds thus produced include the 16-acyloxy compounds represented by Formula I wherein X is β-hydroxymethylene radical and wherein R is the acyl radical of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β - cyclohexylpropionic, cyclohexylformic, cyclohexylacetic, and aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6 - trimethylbenzoic, 2,4,6 - triethylbenzoic, α - naphthoic, 3 - methyl - α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc. Illustrative of the esters thus produced are the 16-acylates such as 6α-methyl-21-fluoro-11β,16α,17α-trihydroxy - 4 - pregnene - 3,20 - dione 16 - acetate, 6α - methyl - 21 - fluoro - 11β,16α,17α - trihydroxy - 1,4-pregnadiene - 3,20 - dione 16 - acetate, 6α - methyl-9α,21 - difluoro - 11β,16α,17α - trihydroxy - 4 - pregnene-3,20 - dione 16 - acetate, 6α - methyl - 9α,21 - difluoro-11β,16α,17α - trihydroxy - 1,4 - pregnadiene - 3,20 - dione 16-acetate, and the like.

The 11β-hydroxyl of the thus produced 16-acylate compounds can be oxidized to the corresponding 11-ketone with an oxidizing agent. Oxidizing agents such as chromic acid, potassium dichromate, a halo-amide, and the like are operative. The oxidation can be carried out by a variety of methods, such as, for example, by oxidizing the said 11β-hydroxy steroid in acetic acid-water solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-haloacylamides and imides. Thereafter, the resulting 11-keto product is recovered by conventional means, such as by dilution with water and extraction with a water-immiscible solvent, e. g., methylene chloride, ether, benzene, toluene, ethyl acetate, or the like. Illustrative of the 11-keto 16-acylates thus produced are for example, 6α - methyl - 21 - fluoro - 16α,17α - dihydroxy 4 - pregnene - 3,11,20 - trione 16 - acetate, 6α - methyl - 9α,21-difluoro - 16α,17α - dihydroxy - 4 - pregnene - 3,11,20-trione 16 - acetate, 6α - methyl - 21 - fluoro - 16α,17α-dihydroxy - 1,4 - pregnadiene - 3,11,20 - trione 16 - acetate, 6α - methyl - 9α,21 - difluoro - 16α,17α - dihydroxy - 1,4 - pregnadiene - 3,11,20 - trione 16 - acetate, and the like.

The 11-keto 16-acylates thus produced may, if desired, be converted to the free alcohols, i. e., 6α-methyl-21 - fluoro - 16α,17α - dihydroxy - 4 - pregnene - 3,11,20-trione, 6α - methyl - 9α,21 - difluoro - 16α,17α - dihydroxy - 4 - pregnene - 3,11,20 - trione, 6α - methyl - 21-fluoro - 16α,17α - dihydroxy - 1,4 - pregnadiene - 3,11,20-trione, and 6α - methyl - 9α,21 - difluoro - 16α,17α-dihydroxy - 1,4 - pregnadiene - 3,11,20 - trione. The alcohols are obtained from the acylates by hydrolysis in accordance with general hydrolysis procedures known in the art. A preferred procedure is to employ at least a molar equivalent of an alkali-metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like. The 16-esters when desired, can again be prepared by esterification of the hydroxyl by esterification procedures hereinbefore described. The preferred esters are those derived from an organic carboxylic acid preferably a hydrocarbon carboxylic acid containing from one to twelve carbon atoms, inclusive.

The following examples are illustrative of the process and products of the present invention, but are not to be construed as limiting.

EXAMPLE 1

6α-methyl-21-fluoro-11β,16α,17α-trihydroxy-4-pregnene-3,20-dione

One hundred milliliters of two percent cornsteep liquor of sixty percent solids was adjusted to pH of 6.8 to 7.4 with sodium hydroxide and was sterilized at fifteen pounds pressure for thirty minutes. To this, was added a similarly sterile solution of two grams of Cerelose (technical grade of dextrose) in four milliliters of water. This sterile medium was inoculated with a suspension of pores and mycelium of *Streptomyces roseochromogenus* (Waksman Collection No. 3689) and was agitated on a rotary shaker for a period of 24 hours by which time a good growth of the organism had taken place. To this 24-hour culture, twenty milligrams of 6α-fluoro-11β,17α-dihydroxy-4-pregnene-3,20-dione dissolved in 0.2 milliliter of dimethylformamide was added. Incubation of the steroid with the microorganism was maintained (with agitation) for five days, at which time the pH was 8.6. The fermentation broth was then separated into the mycelium and the beer by centrifugation. The mycelium was extracted first with two 25-milliliter portions of acetone and then with four successive 25-milliliter portions of methyl isopropyl ketone. The beer was also extracted with four successive 25-milliliter portions of methyl isopropyl ketone. All of the extracts were combined, washed with two percent aqueous sodium bicarbonate solution and with water, dried with anhydrous sodium sulfate, and evaporated to dryness. The residue, which on paper chromatogram analysis showed the presence of 6α-methyl-21-fluoro-11β,16α,17α-trihydroxy-4-pregnene-3,20-dione, was purified by chromatography over synthetic magnesium silicate (Florisil) and crystallization from acetone to give 6α-methyl-21-fluoro-11β,16α,17α-trihydroxy-4-pregnene-3,20-dione.

Following the procedure of Example 1 above, but substituting 6α-methyl-9α,21-difluoro-11β,17α-dihydroxy-4-pregnene-3,20-dione, 6α-methyl-21-fluoro-11β,17α-dihydroxy-1,4-pregnadiene-3,20-dione, or 6α-methyl-9α,21-difluoro-11β,17α-dihydroxy-1,4-pregnadiene-3,20-dione as starting material therein, is productive of 6α-methyl-9α,21-difluoro-11β,16α,17α-trihydroxy-4-pregnene-3,20-dione, 6α-methyl-21-fluoro-11β,16α,17α-trihydroxy-1,4-pregnadiene-3,20-dione, and 6α-methyl-9α,21-difluoro-11β,16α,17α-trihydroxy-1,4-pregnadiene-3,20-dione, respectively.

EXAMPLE 2

*6α-methyl-21-fluoro-11β,16α,17α-trihydroxy-4-pregnene-3,20-dione 16-acetate*

A solution of 1.2 grams of 6α-methyl-21-fluoro-11β,16α,17α-trihydroxy-4-pregnene-3,20-dione (from Example 1) in twenty milliliters of pyridine and twenty milliliters of acetic anhydride was allowed to stand at room temperature (about 25 degrees centigrade) for eighteen hours and was then poured into 200 milliliters of ice-water. The resulting mixture was extracted with methylene chloride and the extract was washed with dilute hydrochloric acid, dilute sodium bicarbonate, and water. After drying the solution with anhydrous sodium sulfate, the solvent was removed by evaporation and the residue was purified by chromatography over synthetic magnesium silicate (Florisil) and crystallization from acetone to give 6α-methyl-21-fluoro-11β,16α,17α-trihydroxy-4-pregnene-3,20-dione 16-acetate.

Following the procedure of Example 2 above but substituting 6α-methyl-9α,21-difluoro-11β,16α,17α-trihydroxy-4-pregnene-3,20-dione, 6α-methyl-21-fluoro-11β,16α,17α-trihydroxy-1,4-pregnadiene-3,20-dione or 6α-methyl-9α,21-difluoro-11β,16α,17α-trihydroxy-1,4-pregnadiene-3,20-dione as starting material therein is productive of 6α-methyl-9α,21-difluoro-11β,16α,17α-trihydroxy-4-pregnene-3,20-dione 16-acetate, 6α-methyl-21-fluoro-11β,16α,17α-trihydroxy-1,4-pregnadiene-3,20-dione 16-acetate and 6α-methyl-9α,21-difluoro-11β,16α,17α-trihydroxy-1,4-pregnadiene-3,20-dione 16-acetate respectively.

Similarly, acylation of 6α-methyl-21-difluoro-11β-16α,17α-trihydroxy-4-pregnene-3,20-dione with the appropriate acid anhydride or acid chloride is productive of still other 16-acylates such as, for example, 6α-methyl-21-fluoro-11β,16α,17α-trihydroxy-4-pregnene-3,20-dione 16-propionate, 6α-methyl-21-fluoro-11β,16α,17α-trihydroxy-4-pregnene-3,20-dione 16-butyrate, 6α-methyl-21-fluoro-11β,16α,17α-trihydroxy-4-pregnene-3,20-dione 16-valerate, 6α-methyl-21-fluoro-11β,16α,17α-trihydroxy-4-pregnene-3,20-dione 16-hexanoate, 6α-methyl-21-fluoro-11β,16α,17α-trihydroxy-4-pregnene-3,20-dione 16-laurate, 6α-methyl-21-fluoro-11β,16α,17α-trihydroxy-4-pregnene-3,20-dione 16-trimethylacetate, 6α-methyl-21-fluoro-11β,16α,17α-trihydroxy-4-pregnene-3,20-dione 16-isobutyrate, 6α-methyl-21-fluoro-11β,16α,17α-trihydroxy-4-pregnene-3,20-dione 16-isovalerate, 6α-methyl-21-fluoro-11β,16α,17α-trihydroxy-4-pregnene-3,20-dione 16-cyclohexane carboxylate, 6α-methyl-21-fluoro-11β,16α,17α-trihydroxy-4-pregnene-3,20-dione 16-benzoate, 6α-methyl-21-fluoro-11β,16α,17α-trihydroxy-4-pregnene-3,20-dione 16-phenylacetate, 6α-methyl-21-fluoro-11β,16α,17α-trihydroxy-4-pregnene-3,20-dione 16-(β-phenyl)-propionate, 6α-methyl-21-fluoro-11β,16α,17α-trihydroxy-4-pregnene-3,20-dione 16-(o-,m-,p-toluate), 6α-methyl-21-fluoro-11β,16α,17α-trihydroxy-4-pregnene-3,20-dione 16-hemisuccinate, 6α-methyl-21-fluoro-11β,16α,17α-trihydroxy-4-pregnene-3,20-dione 16-hemiadipate, 6α-methyl-21-fluoro-11β,16α,17α-trihydroxy-4-pregnene-3,20-dione 16-acrylate, 6α-methyl-21-fluoro-11β,16α,17α-trihydroxy-4-pregnene-3,20-dione 16-undecylenate, 6α-methyl-21-fluoro-11β,16α,17α-trihydroxy-4-pregnene-3,20-dione 16-propiolate, 6α-methyl-21-fluoro-11β,16α,17α-trihydroxy-4-pregnene-3,20-dione 16-cinnamate, 6α-methyl-21-fluoro-11β,16α,17α-trihydroxy-4-pregnene-3,20-dione 16-maleate, 6α-methyl-21-fluoro-11β,16α,17α-trihydroxy-4-pregnene-3,20-dione 16-citraconate.

Similarly, acylation of 6α-methyl-9α,21-difluoro-11β,16α,17α-trihydroxy-4-pregnene-3,20-dione, 6α-methyl-21-fluoro-11β,16α,17α-trihydroxy-1,4-pregnadiene-3,20-dione or 6α-methyl-9α,21-difluoro-11β,16α,17α-trihydroxy-1,4-pregnadiene-3,20-dione with the appropriate acylating agent is productive of the corresponding 16-acylates. The preferred acylates are those corresponding to the acylates described above for 6α-methyl-21-fluoro-11β,16α,17α-trihyroxy-4-pregnene-3,20-dione.

EXAMPLE 3

*6α-methyl-21-fluoro-16α,17α-dihydroxy-4-pregnene-3,11,20-trione 16-acetate*

To a solution of 0.5 gram of 6α-methyl-21-fluoro-11β,16α,17α-trihydroxy-4-pregnene-3,20-dione 16-acetate in twenty milliliters of acetic acid was added a solution of 0.15 gram of chromium trioxide in one-half milliliter of water. The mixture was stirred and maintained at room temperature (about 25 degrees centigrade) for a period of four hours. Thereafter the excess oxidant was destroyed by the addition of 0.5 milliliter of methanol and the mixture was poured into 100 milliliters of water and extracted with methylene chloride. The extract was washed with dilute sodium bicarbonate solution and with water, and was dried and evaporated to dryness. The residue was crystallized from acetone to give 6α-methyl-21-fluoro-16α,17α-dihydroxy-4-pregnene-3,11,20-trione 16-acetate.

Following the procedure of Example 3 above but substituting 6α-methyl-9α,21-difluoro-11β,16α,17α-trihydroxy-4-pregnene-3,20-dione 16-acetate, 6α-methyl-21-fluoro-11β,16α,17α-trihydroxy-1,4-pregnadiene-3,20-dione 16-acetate, or 6α-methyl-9α,21-difluoro-11β,16α,17α-trihydroxy-1,4-pregnadiene-3,20-dione 16-acetate as starting material therein is productive of 6α - methyl - 9α,21 - difluoro-16α,17α - dihydroxy - 4-pregnene - 3,11,20 - trione 16 - acetate, 6α - methyl-21 - fluoro - 16α,17α - dihydroxy - 1,4 - pregnadiene-3,11,20-trione 16-acetate, and 6α-methyl-9α,21-difluoro-16α,17α - dihydroxy - 1,4 - pregnadiene - 3,11,20 - trione 16-acetate, respectively.

Similarly oxidation of other 11β-hydroxy 16-ester compounds of Example 2 is productive of the corresponding 11-keto 16-ester compounds. The preferred 11-keto 16-ester compounds are those wherein the acyl radical is that of an organic carboxylic acid, preferably a hydrocarbon carboxylic acid containing from one to twelve carbon atoms, inclusive.

EXAMPLE 4

6α-methyl-21-fluoro-16α,17α-dihydroxy-4-pregnene-3,11,20-trione

A solution of 1.2 grams of 6α-methyl-21-fluoro-16α,17α - dihydroxy - 4 - pregnene - 3,11,20 - trione 16-acetate, two grams of potassium bicarbonate, 100 milliliters of methanol and fifteen milliliters of water was purged with nitrogen and stirred at 25 degrees centigrade for eight hours. The solution was then neutralized by addition of acetic acid and the methanol was removed by distillation under reduced pressure. The residue was extracted with 100 milliliters of methylene chloride and the extract, after drying over sodium sulfate, was chromatographed over a column of eighty grams of synthetic magnesium silicate using Skellysolve B with increasing amounts of acetone for elution. The product fraction from the column was crystallized from acetone to give 6α - methyl - 21 - fluoro - 16α,17α - dihydroxy - 4-pregnene-3,11,20-trione.

Following the procedure of Example 4, saponification of 6α-methyl - 9α,21 - difluoro-16α,17α-dihydroxy-4-pregnene-3,11,20-trione 16-acetate, 6α-methyl-21-fluoro-16α,17α-dihydroxy-1,4-pregnadiene-3,11,20-trione 16 - acetate and 6α - methyl - 9α,21 - difluoro - 16α,17α-dihydroxy-1,4-pregnadiene-3,11,20-trione 16-acetate of Example 3 is productive of the corresponding hydroxy compounds, 6α-methyl - 9α,21-difluoro-16α,17α-dihdroxy-4-pregnene-3,11,20-trione, 6α - methyl - 21 - fluoro-16α,17α-dihydroxy-1,4-pregnadiene-3,11,20-trione, and 6α-methyl-9α,21-difluoro-16α,17α-dihydroxy-1,4-pregnadiene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 16-oxygenated steroid of the formula:

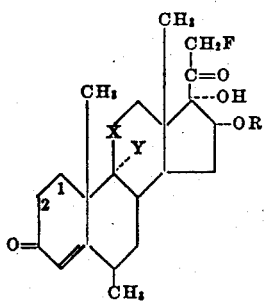

wherein the 1,2-carbon atom linkage is selected from the linkages consisting of single bond and double bond linkages, Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

2. A 16-oxygenated pregnene of the formula:

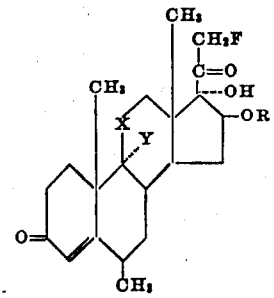

wherein Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

3. 6α - methyl - 21 - fluoro - 11β,16α,17α - trihydroxy-4-pregnene-3,20-dione.

4. 6α-methyl-9α,21-difluoro-11β,16α,17α-trihydroxy-4 - pregnene-3,20-dione.

5. 6α-methyl-21-fluoro-16α,17α - dihydroxy-4-pregnene-3,11,20-trione.

6. 6α - methyl - 9α,21 - difluoro-16α,17α-dihydroxy-4-pregnene-3,11,20-trione.

7. 6α - methyl - 21 - fluoro - 11β,16α,17α-trihydroxy-4-pregnene-3,20-dione 16-acetate.

8. 6α - methyl - 9α,21 - difluoro - 11β,16α,17α - trihydroxy-4-pregnene-3,20-dione 16-acetate.

9. 6α - methyl - 21-fluoro - 16α,17α - dihydroxy - 4-pregnene-3,11,20-trione 16-acetate.

10. 6α - methyl - 9α,21 - difluoro - 16α,17α-dihydroxy-4-pregnene-3,11,20-trione 16-acetate.

11. A 16-oxygenated pregnadiene of the formula:

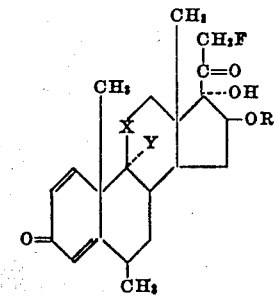

wherein Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

12. 6α - methyl - 21 - fluoro - 11β,16α,17α-trihydroxy-1,4-pregnadiene-3,20-dione.

13. 6α - methyl - 9α,21 - difluoro-11β,16α,17α-trihydroxy-1,4-pregnadiene-3,20-dione.

14. 6α - methyl - 21 - fluoro - 16α,17α-dihydroxy-1,4-pregnadiene-3,11,20-trione.

15. 6α - methyl - 9α,21 - difluoro-16α,17α-dihydroxy-1,4-pregnadiene-3,11,20-trione.

16. 6α - methyl - 21 - fluoro - 11β,16α,17α-trihydroxy-1,4-pregnadiene-3,20-dione 16-acetate.

17. 6α - methyl - 9α,21 - difluoro - 11β,16α,17α - trihydroxy-1,4-pregnadiene-3,20-dione 16-acetate.

18. 6α - methyl - 21 - fluoro - 16α,17α-dihydroxy - 1,4-pregnadiene-3,11,20-trione 16-acetate.

19. 6α - methyl - 9α,21 - difluoro-16α,17α-dihydroxy-1,4-pregnadiene-3,11,20-trione 16-acetate.

No references cited.

UNITED STATES PATENT OFFICE
Certificate of Correction

Patent No. 2,864,836 December 16, 1958

Frank H. Lincoln et al.

It is hereby certified that error appears in the printed specification of the above numbered patent requiring correction and that the said Letters Patent should read as corrected below.

Column 1, lines 27 to 39, the formula should appear as shown below instead of as in the patent—

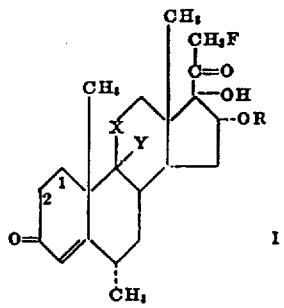

same column 1, lines 46 to 49 inclusive, the β-hydroxymethylene radical should appear as shown below instead of as in the patent—

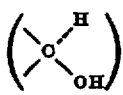

Signed and sealed this 7th day of July 1959.

[SEAL]

Attest:
KARL H. AXLINE,
*Attesting Officer.*

ROBERT C. WATSON,
*Commissioner of Patents.*